United States Patent [19]

Miller

[11] 4,026,138

[45] May 31, 1977

[54] CABLE BENDER

[75] Inventor: Douglas P. Miller, Milwaukee, Wis.

[73] Assignee: Applied Power Inc., Milwaukee, Wis.

[22] Filed: July 12, 1976

[21] Appl. No.: 704,186

[52] U.S. Cl. .................................. 72/321; 72/388
[51] Int. Cl.² .......................................... B21D 9/05
[58] Field of Search ............ 72/388, 457, 458, 321

[56] References Cited
UNITED STATES PATENTS

| | | | |
|---|---|---|---|
| 3,584,493 | 6/1971 | Crees | 72/321 |
| 3,613,430 | 10/1971 | Crees | 72/388 |
| 3,786,668 | 1/1974 | Crees | 72/388 |
| 3,813,914 | 6/1974 | Hagemeyer | 72/388 |

Primary Examiner—C.W. Lanham
Assistant Examiner—Gene P. Crosby
Attorney, Agent, or Firm—James E. Nilles

[57] ABSTRACT

A cable bender apparatus for bending cables, for example of the type having thermoplastic insulation around copper or aluminum strands. The apparatus is connected to a cable for bending the latter to any desired degree and is actuated by, for example, a single acting fluid cylinder. The bending shoe is adjustable on a bending yoke so as to accommodate cable of different diameters and will not inadvertently become disassembled upon relaxation of the bending pressure. The bending saddle swings as the cable is being bent and the arrangement is such that the saddle remains perpendicular to the cable and will not cause the insulation to be ruined as the saddle slides slightly along the insulation.

4 Claims, 9 Drawing Figures

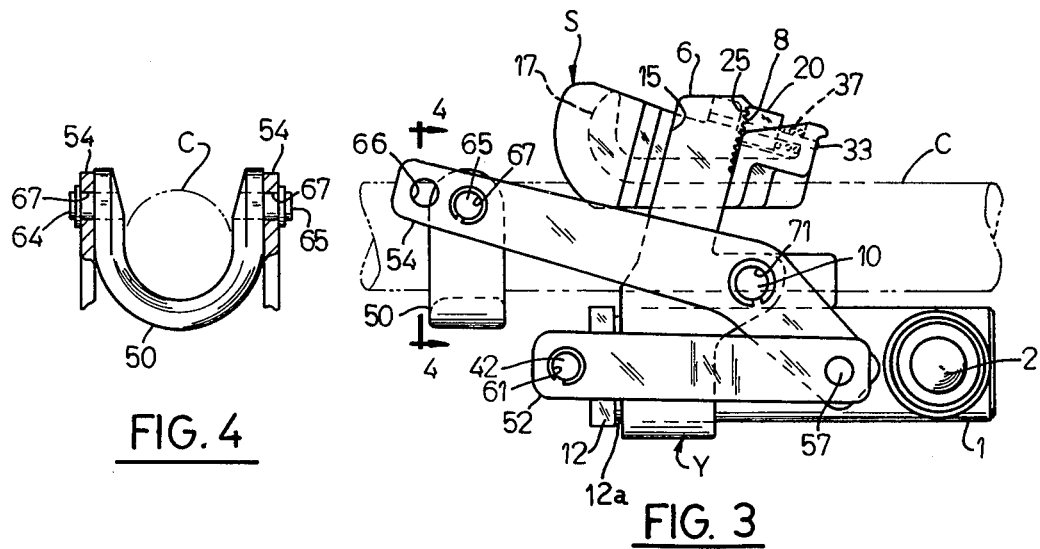
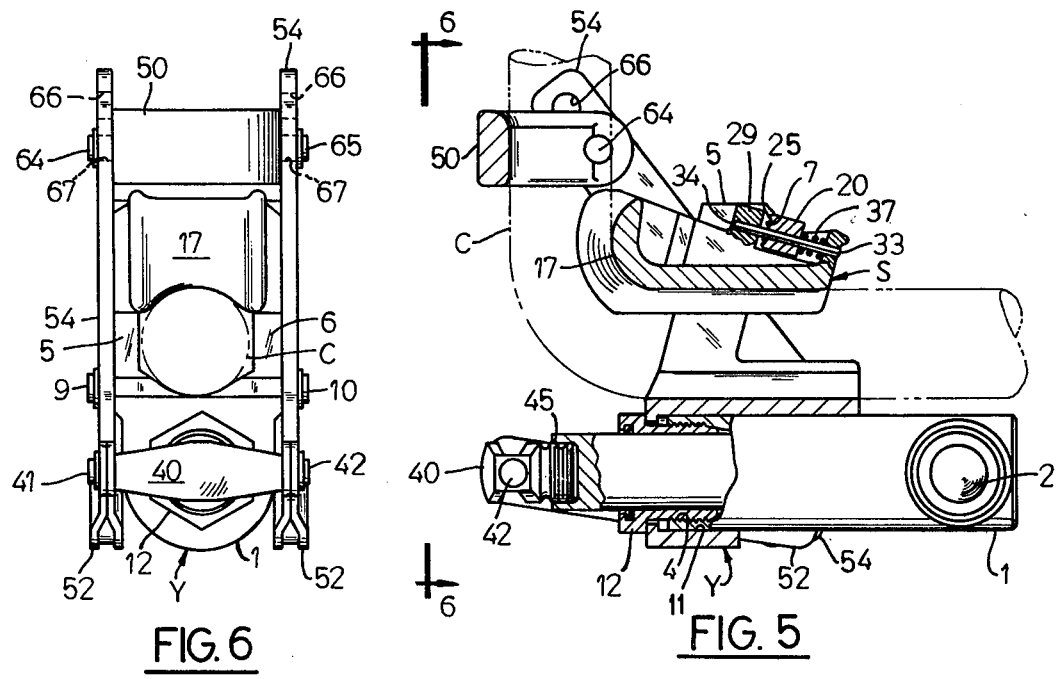

CABLE BENDER

BACKGROUND OF THE INVENTION

The present invention relates to cable benders and more particularly to a fluid actuated bender which can bend cable to a desired angle. It is desirable that the covering over the metal cable is not damaged during the bending operation and it is also desirable that the apparatus can accommodate cable of different dimensions without the necessity of time consuming adjustments such as replacement of saddles and so on of various sizes. It is also desirable that the bending apparatus does not inadvertently become disassembled and fall apart after the bending pressure is released. An example of prior art bending apparatus is shown in the U.S. Pat. No. 3,888,101 issued June 10, 1975 to Crees or a wire bending apparatus such as in U.S. Pat. No. 3,613,430 issued Oct. 19, 1971 to Crees.

SUMMARY OF THE INVENTION

The present invention provides a cable bender which is easily adjustable as to the diameter of the cable to be bent, and more specifically the bending yoke and bending shoe are quickly adjustable relative to one another. The bender of the present invention is particularly compact in its length due to the arrangement between the bending arm and the clevice link; in other words, due to the actuating linkage which is in effect doubled up along its length. In operation, the bending saddle of the present invention swings as the cable is being bent, and the saddle remains perpendicular and consequently does not ruin the cable insulation as the saddle slides slightly over the insulation. Furthermore, in the cable bending apparatus of the present invention, the bending shoe, which easily adjustable relative to the yoke, does not inadvertently become disassembled upon relaxation of the bending pressure, that is after the cable bending operation is completed. Furthermore, the cable bending apparatus of the present invention provides a full range of bending angles without the use of shims, inserts, or the like.

These and other objects and advantages of the present invention will appear hereinafter as this disclosure progresses, reference being had to the accompanying drawings.

BRIEF DESCRIPTION OF THE DRAWINGS

FIG. 3 is a side elevational view of the apparatus shown in FIG. 1 and in the initial position when the bending operation is about to commence;

FIG. 4 is a transverse, sectional view taken along the line 4—4 in FIG. 3;

FIG. 5 is a view similar to FIG. 3, but shown partially in section and furthermore showing the cable being bent and at a bending angle of 90°;

FIG. 6 is a transverse view taken generally from the line 6—6 in FIG. 5;

DESCRIPTION OF A PREFERRED EMBODIMENT

Figure 1:
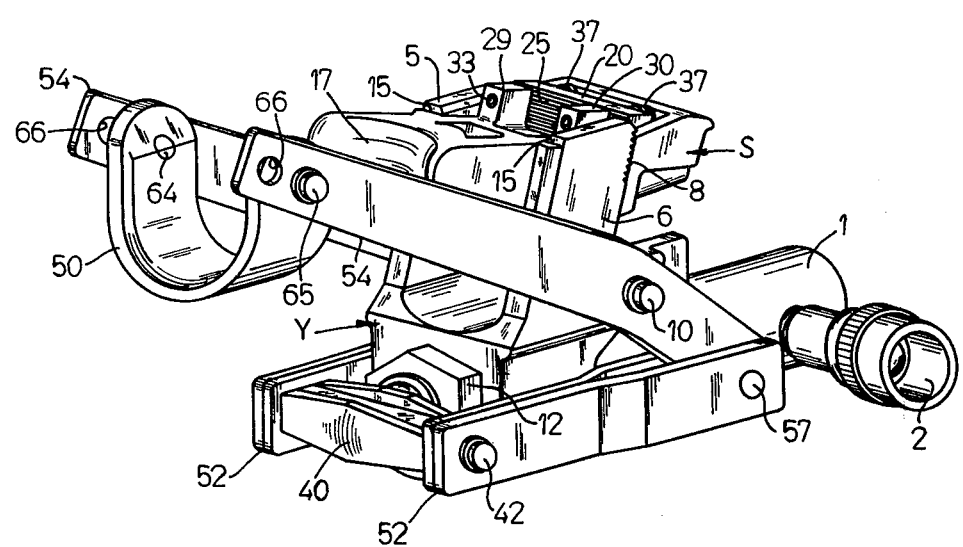
FIG. 1 is a perspective view of a cable bending apparatus made in accordance with the present invention.

The power source for actuating the cable bending apparatus of the present invention takes the form of a single fluid acting cylinder 1 which may be operated, that is extended, by the introduction of fluid pressure (pneumatic or oil for example) through the inlet coupler 2 by a pressure source (not shown). The end of the cylinder 1 has an internal thread 4 for threadably receiving a stop ring 12. A small space is provided between the enlarged portion 12a of the stop ring and the cylinder 1. A bending yoke Y has a pair of spaced apart, upwardly extending arms 5, 6 each of which has a series of teeth 7 and 8, respectively, along their one edge. A pair of pins 9 and 10 extend outwardly from opposite sides of the arms 5 and 6 respectively. The bending yoke Y has an aperture 11 so that is can be freely and swingably mounted on the end of the cylinder 1, but is held captive thereon, by the stop ring. In this manner the cylinder can be rotated to any position relative to the saddle to thereby place the coupler in the most convenient position for hook-up. When the device is in operation, as will appear, the saddle bears tightly against the stop ring and is held captive thereby.

A bending shoe S has a vertical guide-way 15 along each of its sides by means of which it is slideably engaged on the arms 5 and 6 of the bending yoke. The bending shoe has a smooth and polished, curved cable engaging surface 17 against which the cable is urged as the bending process occurs, as will appear.

Figure 2:
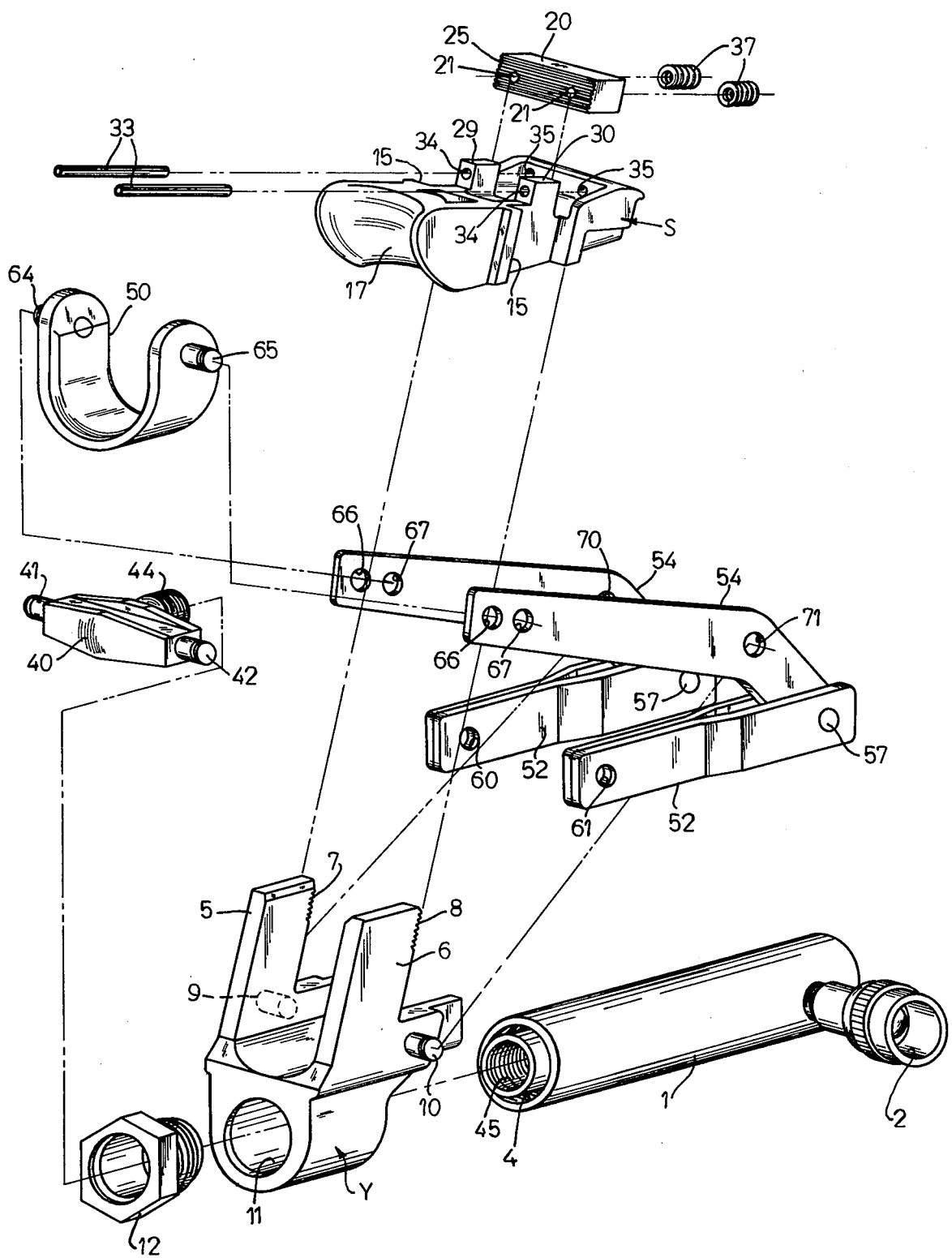
FIG. 2 is a perspective view of the apparatus shown in FIG. 1, but in exploded position.
Figure 9:
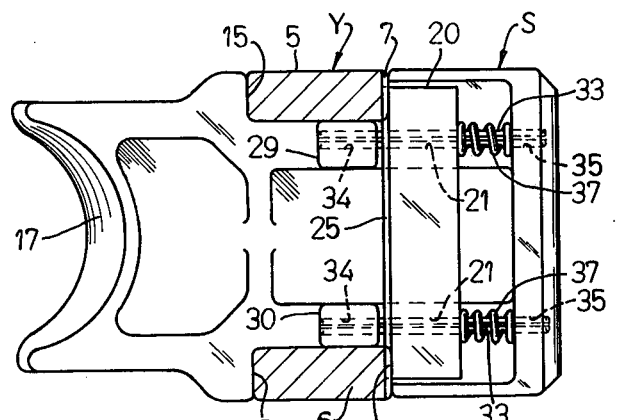
FIG. 9 is a sectional view taken along the line 9—9 in FIG. 7.
Figure 8:
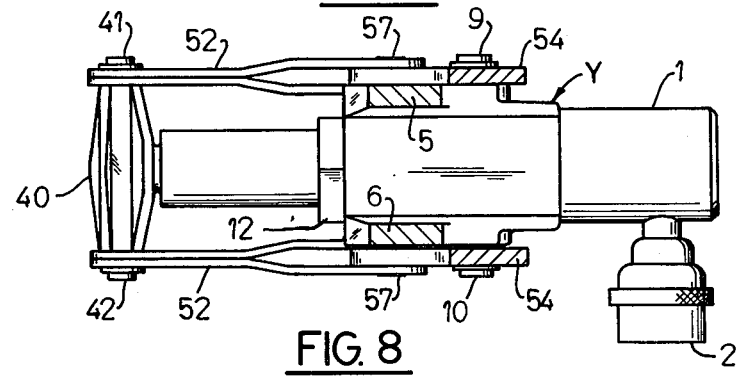
FIG. 8 is a longitudinal view taken generally along the line 8—8 in FIG. 7.

A locking bar 20 having a pair of holes 21 extending therethrough and also having a series of serrated teeth 25 along its one surface is provided for engaging the teeth 7 and 8 of the bending yoke Y. A pair of pins 33 extend through complementary holes 34 in the lugs 29 and 30 and also extend through the holes 35 in the rear end of the bending shoe. The compression springs 37 are located around the rear end of the pins 33 and bear against the rear end of the locking bar so as to urge the latter into teeth engaging position with the teeth of the bending yoke. In this manner, the locking bar can be gripped by the fingers of the operator and pulled rearwardly (to the right as viewed in FIG. 2) thereby disengaging the teeth of the locking bar from the teeth 7, 8 of the bending yoke. This permits the bending yoke and the bending shoe to be moved relative to one another to accommodate different diameters of cables.

When the locking bar is then released, the springs firmly snap it into locking engaging with the yoke and with the bending shoe.

The apparatus also includes a push bar 40 having stub shafts 41, 42 at its opposite ends and furthermore having a threaded central portion 44 which is threadably engaged in the threaded end 45 of the cylinder plunger of cylinder 1. In this manner, extension of the cylinder plunger urges the push bar to the extended position, for example, that shown in either of FIGS. 5 or 7. The bending yoke remains stationarily fixed on the cylinder 1.

The push bar 40 is operatively connected to a cable engaging saddle 50 by means of a compound linkage which includes a pair of clevice links 52 and a pair of bending arms 54. The construction of the clevice links are identical and the construction of the bending arms 54 are identical. The clevice links are bifurcated at their rear ends and are pivotally attached to the rear ends of the bending arms by the pins 57 insertable therethrough. The front end of the clevice link is pivotally attached on the push bar shafts 41 and 42 in that the latter extend through complementary holes 60 and 61 in the forward end of the clevice links. The saddle 50 is adjustably positioned on the forward end of the bending arms, more specifically, the outwardly extending pins 64, 65 are rotatably mounted in either pair of holes 66 or 67 in the front end of the bending arms, depending on the range, squeeze and sharpness of bend to be accomplished. The bending arms are then pivotally connected intermediate their length on the outwardly extending shafts 9 and 10 of the yoke Y and which shafts extend through the holes 70, 71 of the bending arms.

FIG. 3 illustrates the position of the apparatus when the cable C has been inserted in the yoke and in the saddle and at which time the cylinder is contracted and the bending shoe is in position.

FIG. 5 shows the position of the cylinder when it has been partially extending so as to shift the attached clevice 52 forwardly (to the left as viewed in FIG. 5) thereby causing the bending arms 54 to be rotated clockwise on the pins 9 and 10 of the stationary bending yoke Y. This rotation causes the saddle 50 to be swung upwardly to the position shown, thereby carrying with it the cable C and bending it around the smooth curved surface 17 of the bending shoe.

Figure 7:
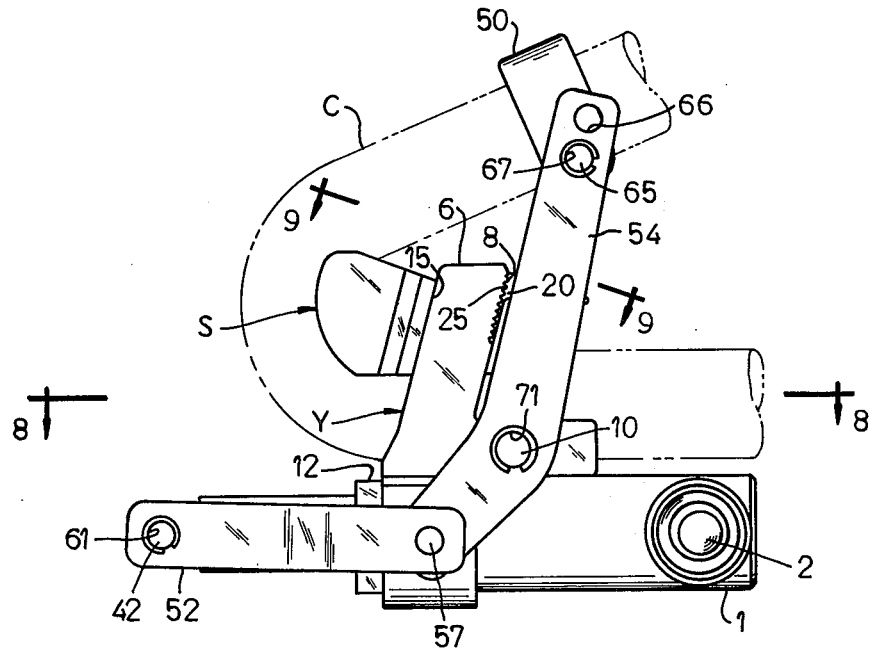
FIG. 7 is a view similar to FIG. 3, but showing the cable when bent further than that shown in FIG. 5.

Further extension of the cylinder 1, as shown in FIG. 7, causes further rotation of the bending arms 54 and consequently further bending of the cable C to over bend the cable and thereby allow for the cable to spring back, depending on the particular cable being bent.

It will be noted that in any position of the saddle as shown in FIGS. 3, 5 or 7, the saddle is positioned at right angles to the cable and the slight sliding movement of the saddle relative to the cable does not cause distortion or injury to the insulation around the cable.

It will also be noted, in referring to FIG. 7, that the bending yoke arms 5 and 6 are positioned at approximately 15 degrees to a vertical line allowing the bending shoe as it is moved up and down the yoke arms to move closer or farther from the bending saddle. This arrangement, together with the plurality of holes 66 or 67, at the end of the bending arms 54, gives a full range of bending of the cable without the use of shims or inserts, etc.

When the pressure is released from the cylinder 1, the arms 54 are swung in an opposition or counterclockwise direction to free the bending apparatus from the cable and yet the bending shoe will not become disassembled from the bending yoke.

It should also be noted that the entire apparatus is compact in an axial direction and does not require a long distance in the longitudinal direction during any bending portion of its operation.

The cylinder can swivel in the yoke to vary position of the cylinder coupler 2 to thereby swing hydraulic hose in a convenient position for bending.

I claim:

1. A cable bending apparatus comprising an extensible power source, a bending yoke secured to said source, a bending shoe adjustably mounted on said yoke and having means for lockable and releasable adjustment relative thereto, a push bar connected to said extensible power source for being shifted thereby, a linkage pivotally connected intermediate its length to said bending yoke and to said push bar, and a cable engaging saddle pivotally connected to said linkage at one end thereof and for being bodily swung by said linkage upon extension of said power source whereby a cable extending through said bending yoke and engaged by said saddle is caused to bend around said bending shoe.

2. The apparatus as set forth in claim 1 further characterized in that said means for releasably adjusting said bending shoe relative to said yoke comprises a serrated locking bar which is resiliently urged against complementary serrations on said bending yoke.

3. The apparatus as set forth in claim 1 further characterized in that said linkage includes a pair of clevice links and a pair of bending arms pivotally connected together adjacent one of their ends, said clevice links are pivotally connected at their other ends to said push bar, and said bending arms are pivotally connected intermediate their length to said bending yoke and are also pivotally connected adjacent their other ends to said saddle.

4. Cable bending apparatus comprising an extensible power source, a bending yoke secured to said source, a bending shoe mounted on said yoke, adjustable means for releasably adjusting said shoe relative to said yoke to thereby accommodate cables of various diameters, said adjustable means comprising a serrated locking bar which is resiliently urged against complementary serrations on said bending yoke, a push bar pivotally connected to said extensible power source for being shifted thereby, a pair of clevice links and a pair of bending arms pivotally connected together adjacent one of their ends, said clevice links pivotally connected at their other ends to said push bar, and said bending arms are pivotally connected intermediate their length to said bending yoke, and a cable engaging saddle pivotally connected to the other ends of said arms for being bodily swung by said bending arms upon extension of said power source, whereby a cable extending through said bending yoke and engaged by said saddle is caused to bend around said bending shoe.

* * * * *